United States Patent Office 2,869,506
Patented Jan. 20, 1959

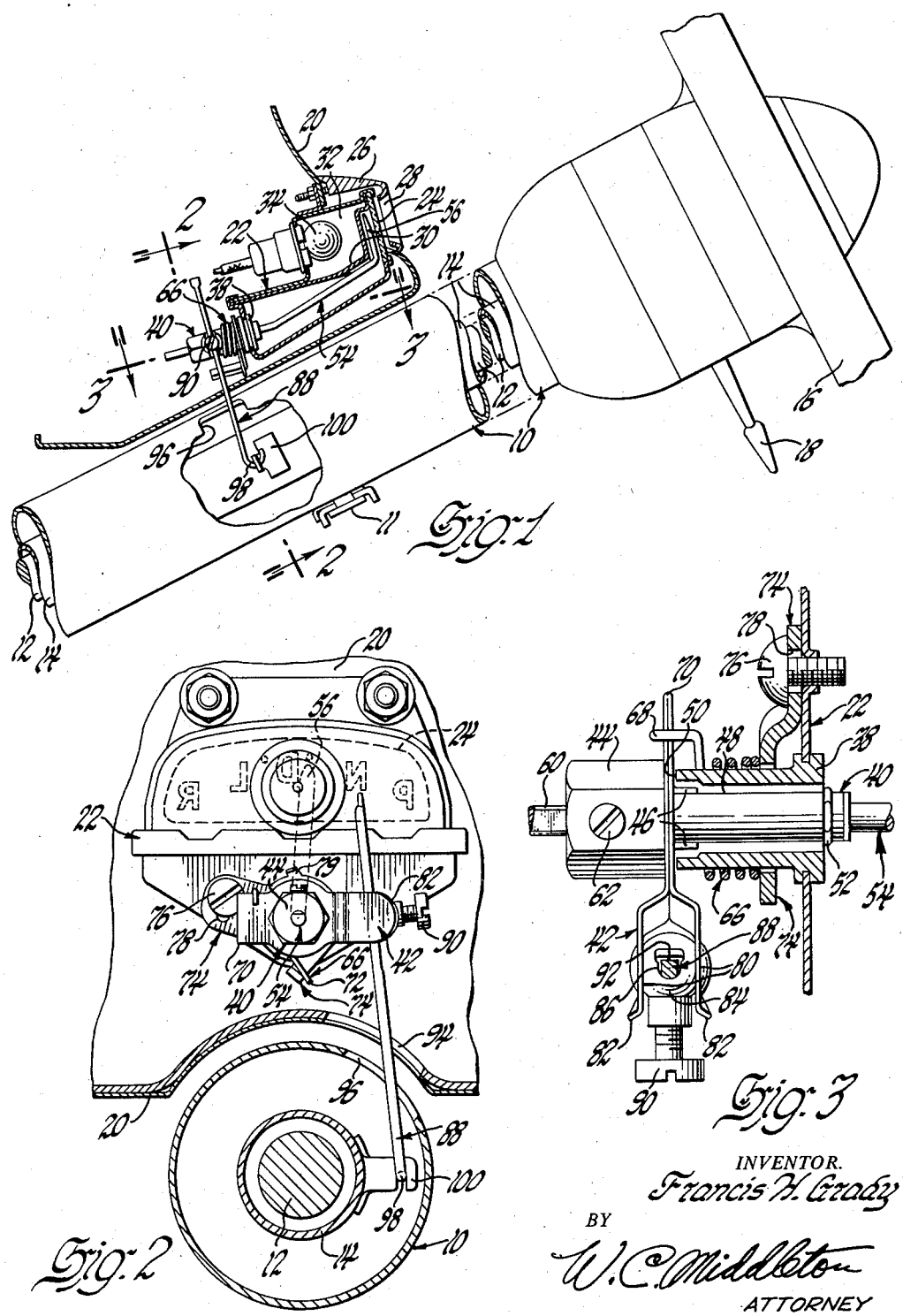

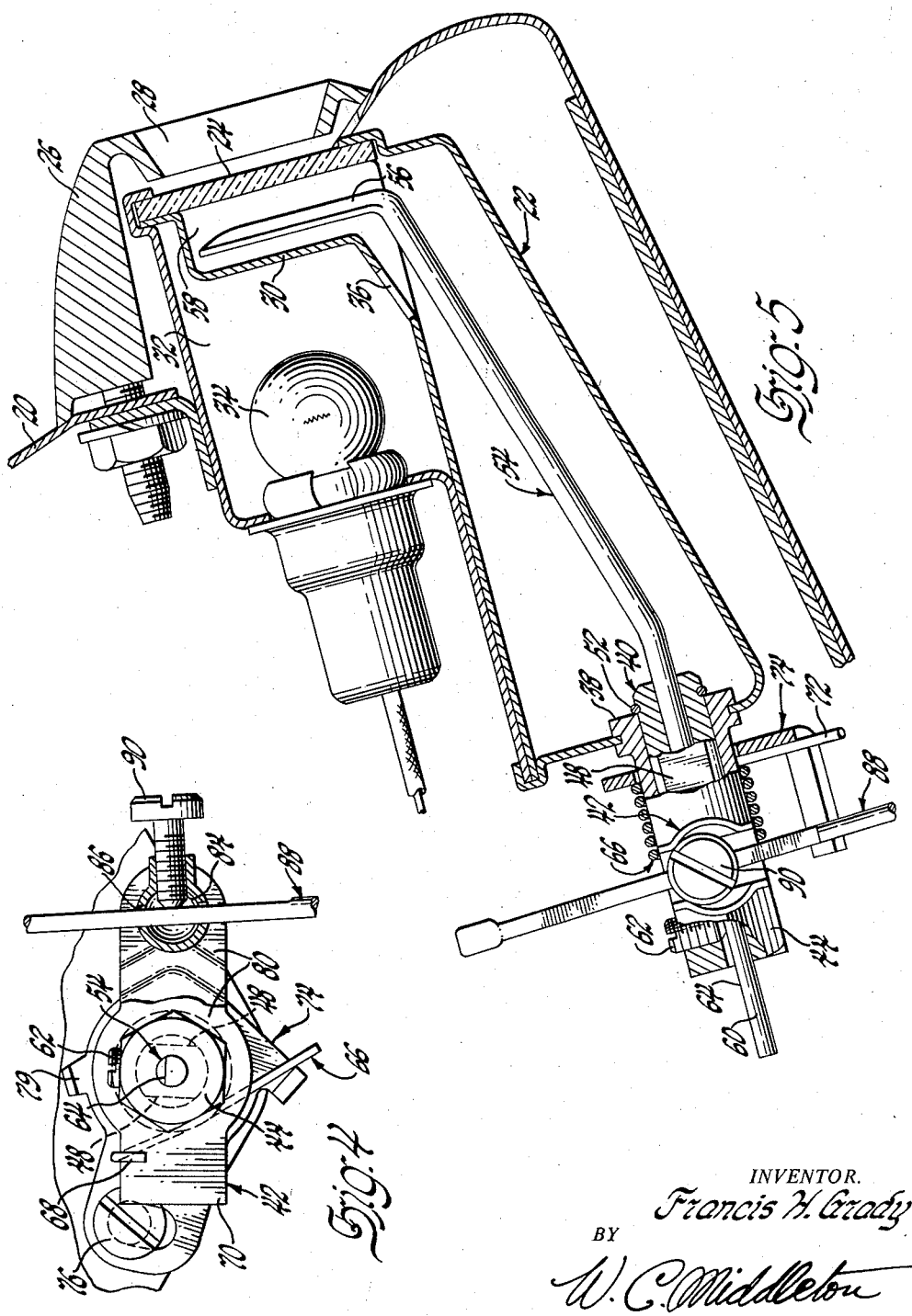

2,869,506

TRANSMISSION CONTROL INDICATOR MECHANISM

Francis H. Grady, Pontiac, Mich., assignor to General Motors Corporation, Detroit, Mich., a corporation of Delaware Application July 29, 1957, Serial No. 674,722

4 Claims. (Cl. 116—124)

This invention relates to indicators for vehicles and particularly to improvements in transmission control indicator mechanism of the type cooperating with steering column mounted transmission controls.

Generally, it is advantageous to mount all instruments, e. g., gas and oil gages, speedometers, transmission control indicators, etc., as a compact assemblage within a closed dust free housing formed on the instrument panel. In such an instrument cluster, the instruments can be visually inspected at a glance minimizing the time interval during which the operator's attention is diverted from the road. With the transmission control indicator being of the type that cooperates with a steering column mounted transmission control, consideration must be given to installation on the final vehicle assembly line since, customarily, the vehicle body including the instrument panel and instrument cluster is secured as a unit to the vehicle chassis which includes the steering column. The connection of the transmission control and the transmission control indicator must be conveniently and quickly made and should include an appropriate adjustment assuring proper alignment of the transmission control indicator.

With the above in mind, the invention contemplates a transmission control indicator mechanism of such character that is simplified structurally and inexpensive to manufacture, that is suited for enclosure within a dust free instrument cluster housing mounted on the vehicle instrument panel, that is easily and conveniently connected with the transmission control, that is quickly and effectively adjusted, that is efficient in operation, and that is readily accessible during installation.

Specifically, the invention provides a transmission control indicator mechanism that is installed as two separate subassemblies with the proper alignment and adjustment of one being preset in such a manner that only a single connection of the two subassemblies and a subsequent quick adjustment of this connection is required on the final assembly line.

In carrying out the foregoing, according to one form of the invention an instrument housing is formed on the instrument panel above a steering column. An appropriate transmission indicator needle is adjustably secured to a housing supported sleeve for movement across the face of an indicator dial mounted in the instrument housing. Clamping fingers on the sleeve provide a detachable connection with a spherical pivot member which, in turn, is connected to one end of a link while the opposite end of this link is connected to a transmission control shaft within the steering column. A torsion spring coacts with the fingers to rotate the indicator needle to one of a plurality of transmission control shaft settings. With this arrangement, the spherical pivot member is free to move up and down the link until in a position in which the pivot member can be interposed between the clamping fingers without altering the setting of the needle established by the spring. Then the link is clamped to the spherical pivot member, establishing the proper adjustment and alignment of the mechanism.

The foregoing and other objects and advantages of the invention will be apparent from the following description, and from the accompanying drawings, in which:

Figure 1 is a sectional view of a transmission control indicator mechanism shown in conjunction with a vehicle steering column;

Figure 2 is an enlarged view of the mechanism looking in the direction of the arrows 2—2 in Figure 1;

Figure 3 is an enlarged partial sectional view of the mechanism along lines 3—3 of Figure 1;

Figure 4 is an enlarged view of a part of the mechanism shown in Figure 2; and

Figure 5 is an enlarged sectional view of a part of the mechanism shown in Figure 1.

Referring to the drawings and particularly to Figure 1, the numeral 10 designates generally, a diagonally upwardly extending vehicle steering column appropriately mounted at 11. A steering shaft 12 and a hollow transmission control shaft 14 are concentrically and rotatably disposed within the steering column 10 with the steering shaft 12 located within the hollow transmission control shaft 14. The steering shaft 12 has a conventional steering wheel 16 attached to the upper end thereof while the upper end of the transmission control shaft 14 is suitably secured to a transmission shift lever 18. An instrument panel 20 partially encloses the steering column 10, as viewed in Figure 2, and has bolted or otherwise affixed thereto, above the steering column 10, an irregularly shaped indicator or instrument housing specified generally at 22. An indicator dial, e. g., a transparent lens 24, is attached to the forward part of this housing 22 and has on the face thereof the legends depicted in Figure 2, namely, P, N, D, L, and R corresponding, respectively, to Park, Neutral, Drive, Low and Reverse settings for a transmission (not shown). A shell 26 is secured to the instrument panel 20 and outlines an opening 28 which permits visual inspection of the dial 24 by the vehicle operator. A backing plate 30 affixed to the housing 22, affords a light chamber 32 in which is located a small electric lamp 34. The lamp 34 may be suitably connected to the instrument cluster light circuit for furnishing night driving light through an opening 36 in the plate 30 to the lens 24.

As best shown by Figures 3 and 5, at the rear part of the housing 22, a bearing member 38 is installed for rotatably supporting a hollow sleeve 40. A clamp member 42, which may be in the form of a metal stamping, is located on the bearing portion of the sleeve 40 next to the hex-head portion 44 and is rotatable therewith through the co-action of lanced out tangs 46 with oppositely disposed flats 48 (see Figure 4) on the bearing part of the sleeve 40. The hollow sleeve 40 is axially positioned against a shoulder 50 on the bearing member 38 by a retaining ring 52 connected to the terminal end of the sleeve 40.

An indicator needle of suitable wire stock material shown generally at 54 includes a pointer end 56 which is positioned in a pocket 58 defined by the lens 24 and the backing plate 30. An opposite guide end 60 of the needle 54 is fixedly positioned within the hollow sleeve 40 by the engagement of a set screw 62 with a flat 64 on end 60. The housing 22 is preferably elongated downwardly along the steering column 10 to afford a larger operating radius for the indicator needle 54. To explain this further, reference is made to Figure 2 which demonstrates the relative positions of the hollow sleeve 40 and the pointer end 56 of the needle 54. As can be seen, the turning radius for the needle 54 is established by the distance of the sleeve 40 from the end of the pointer 56 and, consequently, determines the necessary spacing of the legends on the lens 24. If this radius is too small, the legends must be spaced closer together on a reduced diameter, hence, rendering the numerals less legible to the operator when viewed from a normal distance.

Disposed on the bearing member 38 is a torsion spring 66 having an end 68 engaging an adjacent arm 70 on the clamping member 42 and an opposite arm 72 engaging the end of an L-shaped adjusting plate 74. The adjusting plate 74 is attached to the housing 22 by an adjusting screw 76. A slot 78 is afforded in the L-shaped plate 74 to permit slight rotational movement of the plate and, consequently, the biasing effect of the torsion spring 66 on the clamping member 42 may be varied. In the preferred embodiment, to obtain a starting adjustment for the mechanism, the torsion spring 66 is intended to exert a bias that urges the pointer end 56 of the needle 54 to the Park position in which position the arm 70 on the clamp member 42 engages a stop 79 on the adjusting plate 74. After the needle 54 is installed and clamped in place by the set screw 62, the plate 74 can be rotated slightly, if necessary, to insure that the needle pointer 56 is opposite the legend P on the lens 24 and against the stop 79.

With reference to Figures 3 and 4, the clamp member 42 is provided with oppositely disposed clamping fingers 80 having outwardly turned ends 82. The ends 82 aid in the insertion of a spherical pivot 84 which, after installation, is retained due to the inward bias exerted by clamping fingers 80. An opening 86 in the spherical pivot member 84 is arranged to receive the upper end of a link 88 (see Figure 4) which link is held against sliding and rotating movement by the engagement of an adjusting screw 90 with a flat 92 on the link 88.

As best demonstrated by Figure 2, the link 88 extends downwardly through aligned openings 94 and 96 in the instrument panel 20 and the steering column 10, respectively, and by means of a hook end 98 engages a tab 100 laterally extending from the transmission control shaft 14. By utilizing a pivot member 84 of spherical configuration, many of the misalignments occuring between the transmission control shaft tab 100 and the clamping member 42 can be compensated automatically without any manual adjustment. Also, by the adjusting screw 90 variations in the distance between the tab 100 and the spherical pivot 84 can be corrected by altering the position along the link 88 at which the adjusting screw is clamped to eliminate lost motion in the mechanism.

From the foregoing, it can be seen that the installation of this transmission control indicator mechanism is considerably simplified. Initially, the pointer end 56 of the needle 54 is aligned opposite the numeral P on the lens 24 either after or before the housing 22 is secured to the instrument panel 20. Subsequently, when the vehicle body (not shown) including the instrument panel 20 is lowered onto the vehicle chassis (not shown), this first adjustment is retained and the link 88 with a spherical member 84 loosely positioned thereon may be installed by connecting the hook end 98 to the tab 100 and then thrusting the pivot member 84 between the fingers on the clamp member 42. The adjusting screw 90 is tightened when the lost motion is removed between the tab 100 and the clamping member 42.

It should be noted that the bias exerted by the torsion spring 66 toward the Park position of the needle is not sufficient to overcome the bias exerted by appropriate detents (not shown) associated with the transmission for each of the transmission settings. In other words, when the needle pointer 56 is moved to some other position, e. g., Low, the detents will hold the transmission control shaft 14 in this position and the bias exerted by the torsion spring 66 urging the pointer toward the Park position will not be sufficient to overcome the detents.

The invention is to be limited only by the following claims.

I claim:

1. In combination, an instrument panel for a vehicle, a steering column, a transmission control rotatably supported by the steering column, a dial housing mounted on the instrument panel and having legends thereon corresponding to the transmission settings of the transmission control, an indicator member supported by the dial housing for movement relative to the legends, and an adjustable clamp and pivot connection between the indicator member and the transmission control.

2. In combination, an instrument panel for a vehicle, a steering column, a transmission control rotatably supported by the steering column, a dial mounted on the instrument panel and having legends thereon corresponding to the transmission settings of the transmission control, an indicator member for the dial, adjustable means for setting the indicator member opposite one of the dial legends so as to establish an alignment therebetween, and an adjustable pivotal connector for interconnecting the indicator member and the transmission control so as to maintain the alignment between the indicator member and the dial legends.

3. In combination an instrument panel for a vehicle, a steering column having a rotatable transmission control shaft concentrically disposed therein, a dial mounted on the instrument panel and having legends thereon corresponding to the transmission settings of the transmission control shaft, a sleeve rotatably mounted on the instrument panel, an indicator needle for the dial adjustably connected to the sleeve, clamping fingers on the sleeve, a pivot member detachably retained by the clamping fingers, and a link having one end adjustably connected to the pivotal member and the opposite end connected to the transmission control shaft.

4. In combination, an instrument panel for a vehicle, an instrument housing formed on the instrument panel, a steering column, a rotatable transmission control shaft concentrically disposed within the steering column, a dial formed in the housing and having legends thereon corresponding to the transmission settings of the transmission control shaft, a sleeve rotatably supported on the housing, an indicator member having one end terminating in a pointer portion movable across the dial and an opposite end slidably positioned in the sleeve, biasing means adjustable for urging the indicator member to one of the transmission settings, clamping fingers on the sleeve, a spherical pivot member detachably connected by the clamping fingers to the sleeve, and a link having one end adjustably connected to the spherical pivot member and the opposite end connected to the transmission control shaft so as to maintain the setting of the indicator member.

References Cited in the file of this patent

UNITED STATES PATENTS

| | | |
|---|---|---|
| 2,732,905 | Anderson | Jan. 31, 1956 |
| 2,737,147 | Bliss | Mar. 6, 1956 |